US011181947B2

(12) United States Patent
de la Fuente (10) Patent No.: US 11,181,947 B2
(45) Date of Patent: Nov. 23, 2021

(54) HINGE MECHANISM WITH INTEGRATED SLIDER AND FOLDABLE DEVICE HAVING SAME

(71) Applicant: Google LLC, Mountain View, CA (US)

(72) Inventor: Valentin de la Fuente, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 20 days.

(21) Appl. No.: 16/947,094

(22) Filed: Jul. 17, 2020

(65) Prior Publication Data

US 2021/0018962 A1 Jan. 21, 2021

Related U.S. Application Data

(60) Provisional application No. 62/875,272, filed on Jul. 17, 2019.

(51) Int. Cl.
*G06F 1/16* (2006.01)
(52) U.S. Cl.
CPC .......... *G06F 1/1652* (2013.01); *G06F 1/1616* (2013.01); *G06F 1/1624* (2013.01)

(58) Field of Classification Search
CPC .... G06F 1/1652; G06F 1/1624; G06F 1/1641; G06F 1/1681; G06F 1/1616; H04M 1/0268; H04M 1/0216; G09F 9/301
See application file for complete search history.

(56) References Cited

U.S. PATENT DOCUMENTS

| 6,577,496 B1* | 6/2003 | Gioscia | G06F 1/1616 |
| | | | 345/156 |
| 9,119,316 B2* | 8/2015 | Lee | G06F 1/1652 |
| 9,996,108 B2* | 6/2018 | Morrison | G06F 1/1681 |
| 10,152,086 B2* | 12/2018 | Choi | G06F 1/1652 |
| 10,234,899 B1 | 3/2019 | Brocklesby, et al. | |
| 10,509,441 B2* | 12/2019 | Wu | G06F 1/1652 |

* cited by examiner

*Primary Examiner* — James Wu
(74) *Attorney, Agent, or Firm* — Brake Hughes Bellermann LLP (57) ABSTRACT

A foldable device may include a foldable layer and a hinge mechanism that supports and guides the folding and unfolding of the foldable device including the foldable layer. The hinge mechanism may include a spring stiffener made of a high yield strength material to support the folding and the unfolding of the foldable device. The spring stiffener may have a first end thereof fixed to a first portion of a housing of the computing device, and a second end thereof that is slidable relative to a second portion of the housing. The sliding of the second end of the spring stiffener may accommodate the bending of a bendable section of the foldable layer.

20 Claims, 6 Drawing Sheets

HINGE MECHANISM WITH INTEGRATED SLIDER AND FOLDABLE DEVICE HAVING SAME

CROSS REFERENCE TO RELATED APPLICATION

This application claims priority to U.S. Provisional Application No. 62/875,272, filed on Jul. 17, 2019, the disclosure of which is incorporated by reference herein in its entirety.

TECHNICAL FIELD

This description relates, in general, to hinge mechanisms for foldable devices and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms may produce a somewhat artificial folding motion and may introduce stress and/or impact on the foldable display device, thus damaging components of the foldable display device. Flexible support in a bending area of the foldable display device may provide a more natural folding motion, may maintain a desired contour, or curvature, of the foldable display device in the folded configuration, and a desired flatness in the unfolded configuration, and may prevent damage due to excessive compression and/or tension exerted on components of the foldable display device.

SUMMARY

In a general aspect, a foldable organic light emitting diode (OLED) device may include a foldable OLED display, a first display stiffener fixed to a first section of the foldable OLED display, a second display stiffener fixed to a second section of the foldable OLED display, and a device housing. The device housing may include a first housing fixed to the first display stiffener, and fixed to the first section of the foldable OLED display and a second housing spaced apart from the first housing, the second housing being fixed to the second display stiffener, and fixed to the second section of the foldable OLED display. The OLED device may also include a spring stiffener sheet positioned between the device housing and the first and second display stiffeners. The spring stiffener sheet may include a first end portion fixed to the first housing, the first display stiffener and the first section of the foldable OLED display, and a second end portion movable in a space formed between the second housing and the second display stiffener.

In some implementations, a bendable section of the foldable OLED display may be defined between the first section and the second section of the foldable OLED display. In some implementations, a display support may be positioned between the first display stiffener and the second display stiffener, at a position corresponding to the bendable section of the foldable OLED display. In some implementations, the display support may be made of a compliant foam material that is conformable to a contour of the bendable section of the foldable OLED display, such that the display support is in a compressed state in a folded configuration of the foldable OLED display, and the display support is in an expanded state in an unfolded configuration of the foldable OLED display.

In some implementations, in a response to a folding action on the foldable OLED device, the first end portion of the spring stiffener sheet may remain fixed to the first housing, the first display stiffener, and the first section of the foldable OLED display, and the second end portion of the spring stiffener sheet may slide in a first direction within the space formed between the second housing and the second display stiffener. In some implementations, in a response to an unfolding action on the foldable OLED device, the first end portion of the spring stiffener sheet may remain fixed to the first housing, the first display stiffener, and the first section of the foldable OLED display, and the second end portion of the spring stiffener sheet may slide in a second direction, opposite the first direction, within the space formed between the second housing and the second display stiffener.

In some implementations, channels may be defined in opposite lateral sides of an interior portion of the second housing. The channels may be configured to slidably receive corresponding outer peripheral edges of the second end portion of the spring stiffener sheet, so as to guide the sliding of the spring stiffener sheet in the first and second directions within the space formed between the second housing and the second display stiffener.

In some implementations, the spring stiffener sheet may be made of a high yield strength steel material. In some implementations, the spring stiffener sheet may be configured to bias the foldable device to an unfolded configuration.

In some implementations, at least one first magnet may be installed in the first housing, and at least one second magnet may be installed in the second housing, at a position corresponding to the position of the first magnet installed in the first housing in a folded configuration of the foldable device, such that an attractive force between the first magnet and the second magnet maintains the foldable device in the folded configuration.

Implementations can include one or more of the following features, in isolation, or in any combination with each other.

DETAILED DESCRIPTION

A computing device including a hinge mechanism, in accordance with implementations as described herein, may provide a relatively simple, and a relatively reliable, mechanism to support and guide the folding and the unfolding of a foldable display of the computing device, using a relatively natural folding and unfolding motion. In some implementations, the hinge mechanism may maintain the foldable display within allowable bending radius limits in the folded configuration of the computing device. For example, in some implementations, the hinge mechanism may restrict, or limit an amount of bending of a bendable section of the foldable display. In some implementations, the hinge mechanism may maintain a desired degree of planarity of the foldable display in the unfolded configuration of the computing device. In some implementations, the hinge mechanism may restrict, or limit, movement or bending of the bendable section of the foldable display to approximately 180 degrees, to maintain planarity of the foldable display in the bendable section, and to restrict, or limit the foldable display from bending beyond approximately 180 degrees. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, without the use of complex gearing and sliding devices, while still providing support to the foldable display, and while still maintaining the foldable display within allowable bending radius limits.

Figure 1A:
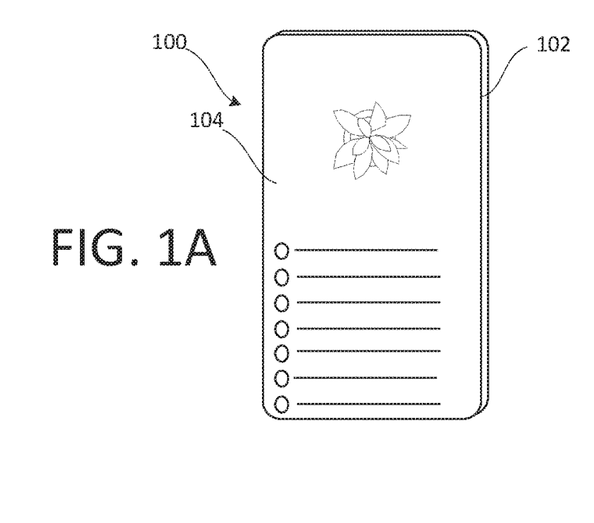
FIGS. 1A-1D illustrate an exemplary computing device including an exemplary foldable display.
Figure 1B:
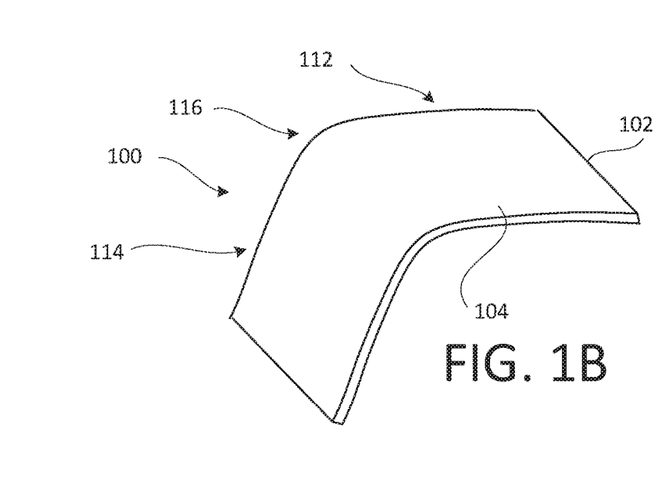
Figure 1C:
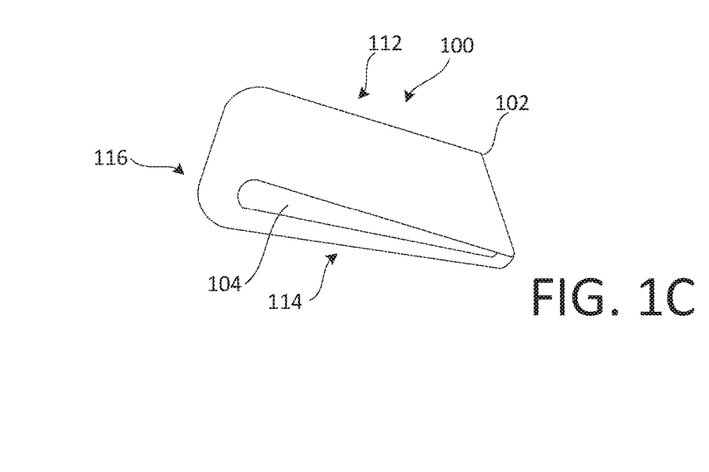
Figure 1D:
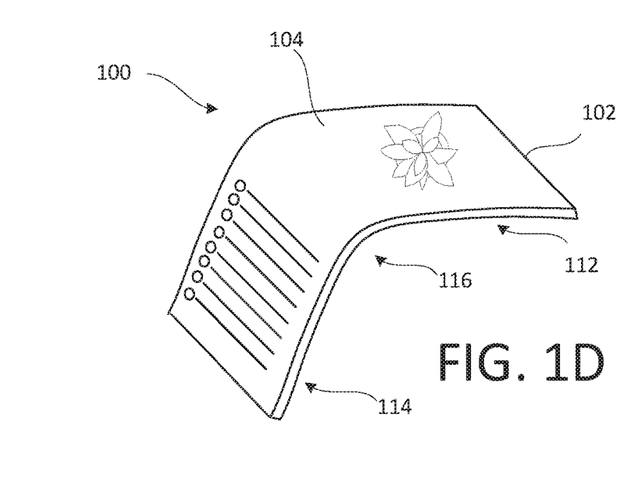

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, the hinge mechanism may prevent the foldable display 102 from bending beyond a minimum bending radius, for example, in the folded configuration (e.g., less than 10 millimeters, less than 5 millimeters, or less than 2 millimeters) and/or from bending beyond a maximum bending radius, for example, in the unfolded configuration.

Figure 2:
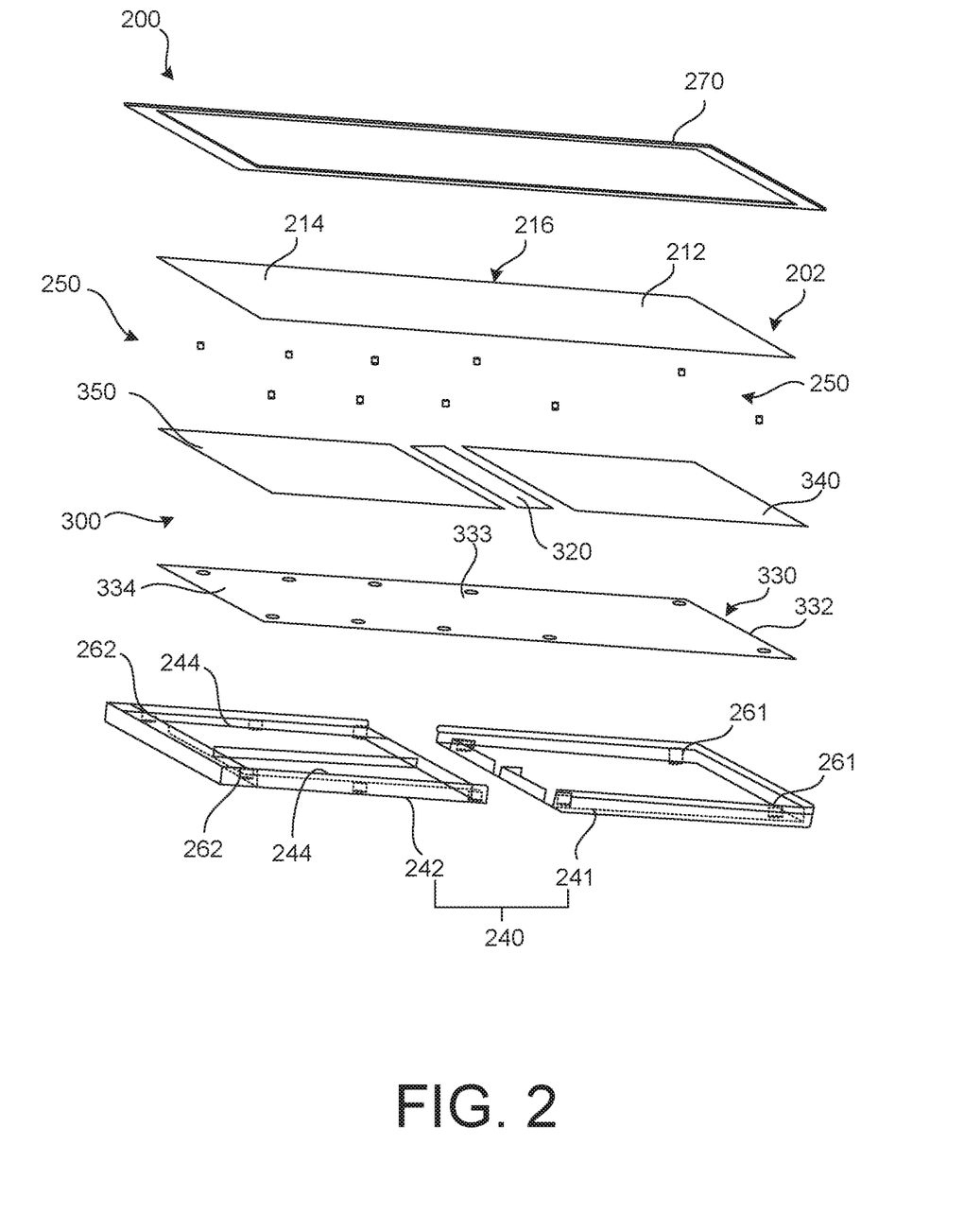
FIG. 2 is an exploded perspective view of an exemplary computing device, in accordance with implementations described herein.
Figure 3A:
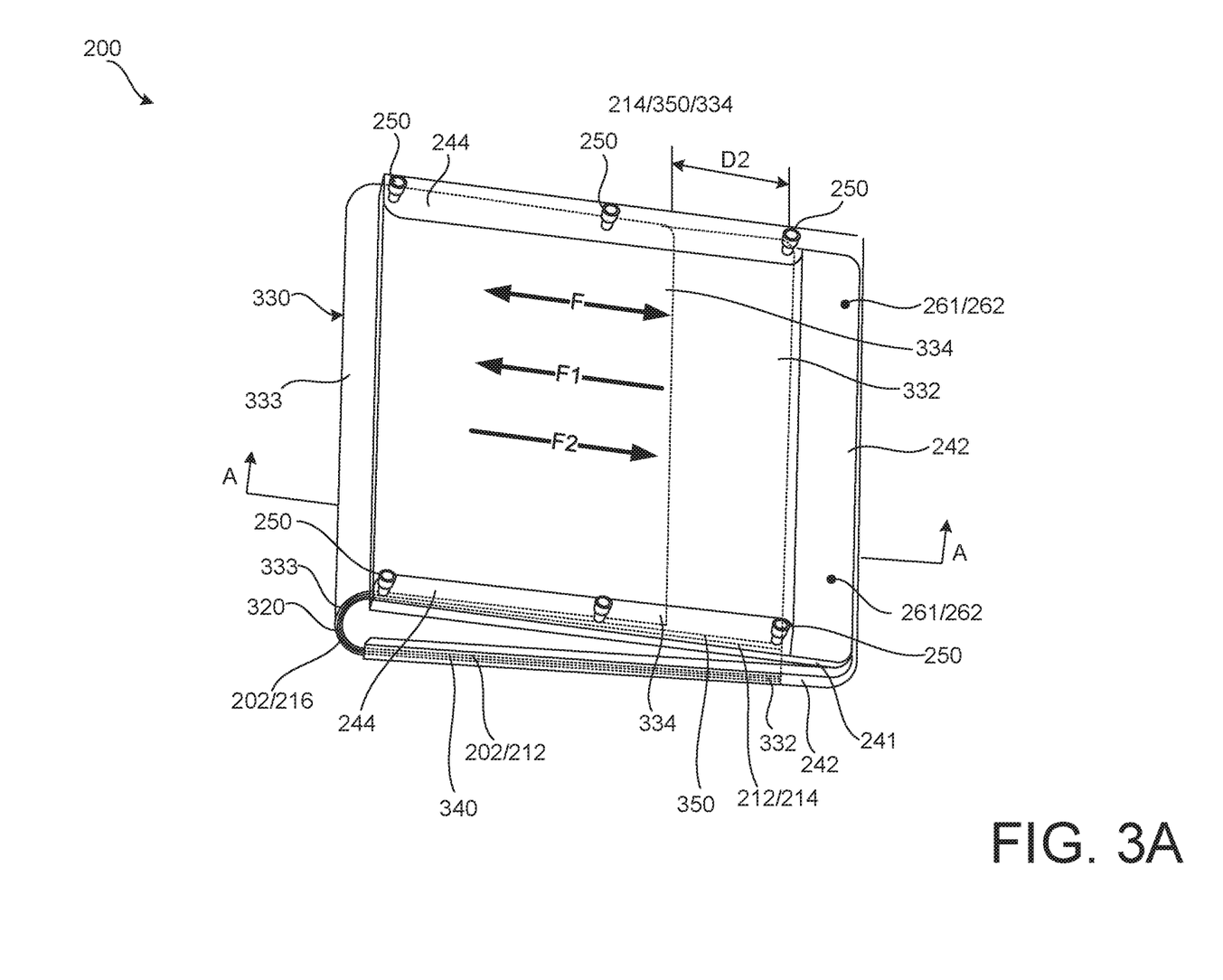
FIG. 3A is a top perspective view of the exemplary computing device 200 shown in FIG. 2, in a folded configuration, in accordance with implementations described herein.
Figure 3B:
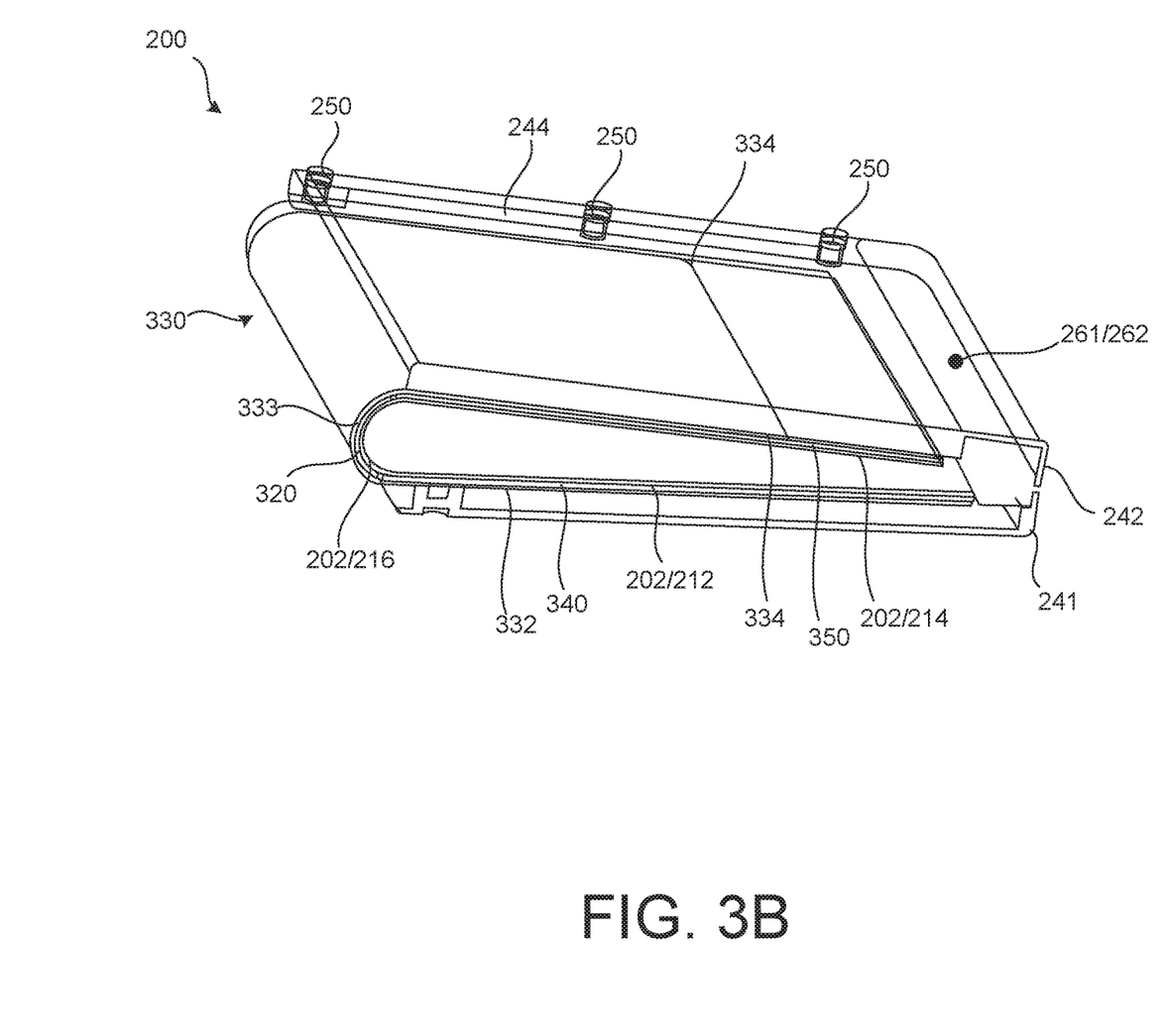
FIG. 3B is a cross-sectional side view of the exemplary computing device shown in FIG. 2, in the folded configuration, in accordance with implementations described herein.
Figure 4A:
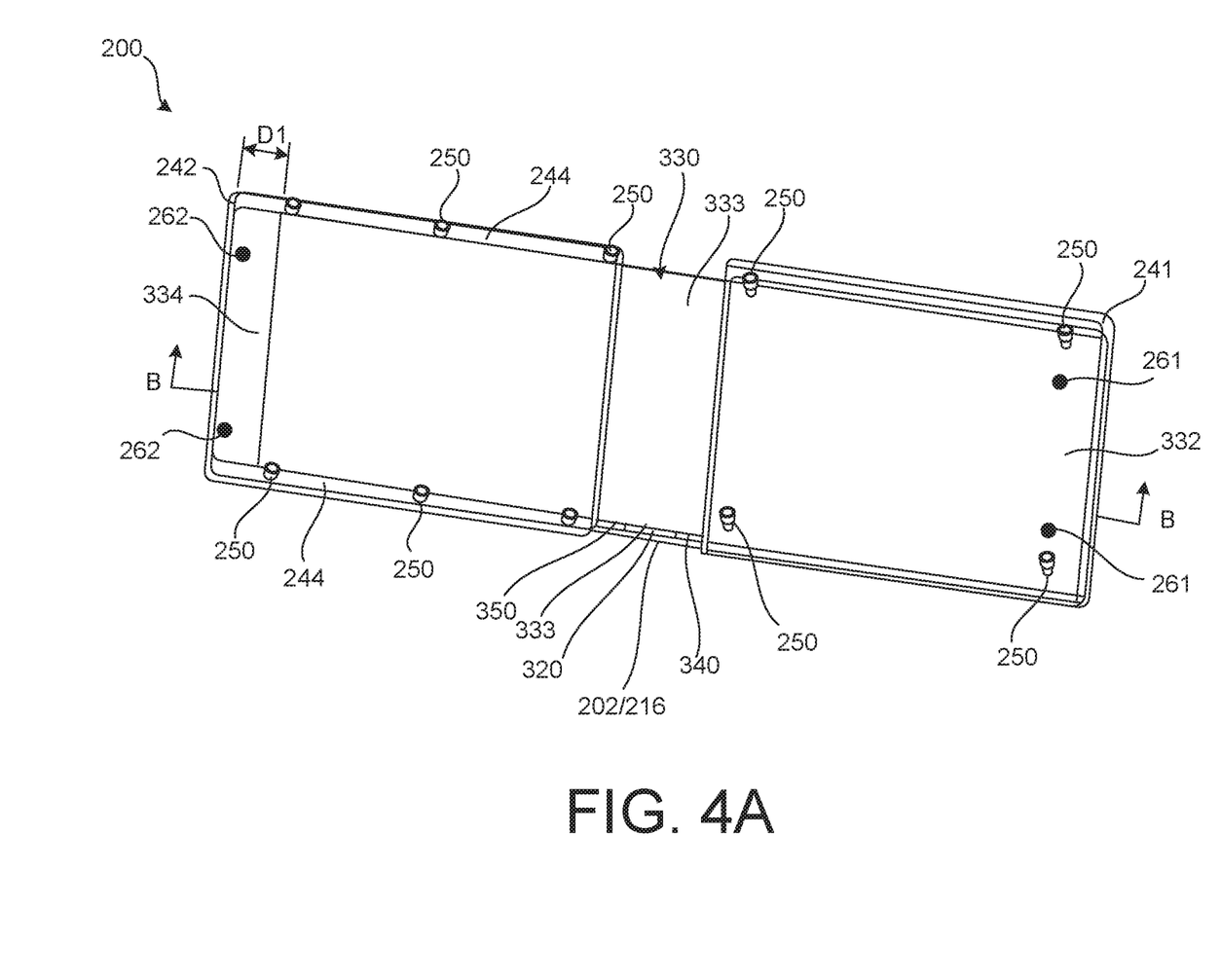
FIG. 4A is a perspective view of the exemplary computing device shown in FIG. 2, in an unfolded configuration, from a housing side of the exemplary computing device 200, in accordance with implementations described herein.
Figure 4B:
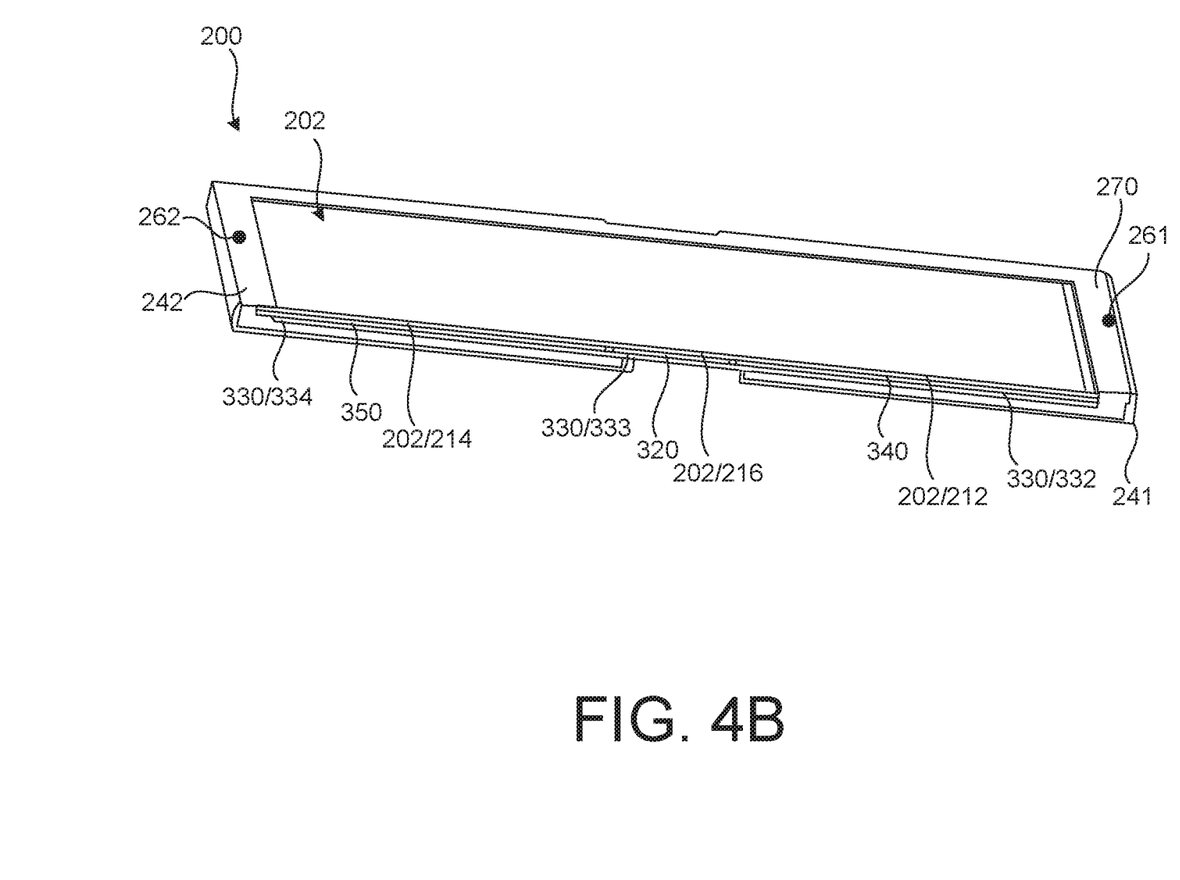
FIG. 4B is a cross-sectional perspective view of the exemplary computing device shown in FIG. 2, in the unfolded configuration, from a display side of the exemplary computing device 200, in accordance with implementations described herein.

FIG. 2 is an exploded perspective view of an exemplary computing device 200 including an exemplary slidable hinge mechanism 300, in accordance with implementations described herein. FIGS. 3A and 3B illustrate the exemplary computing device 200 including a foldable layer 202, such as, for example, a foldable display 202, in the folded configuration, and FIGS. 4A and 4B are perspective views of the exemplary computing device 200 in the unfolded configuration. In particular, FIG. 3A is a top perspective view of the exemplary computing device 200 in the folded configuration. FIG. 3B is a cross-sectional perspective view of the exemplary computing device 200 in the folded configuration, taken along line A-A of FIG. 3A. FIG. 4A is a perspective view of the exemplary computing device 200 in the unfolded configuration, from a housing side of the exemplary computing device 200. FIG. 4B is a cross-sectional perspective view of the exemplary computing device 200 in the unfolded configuration, from a display side of the exemplary computing device 200, taken along line B-B of FIG. 4A.

The exemplary computing device 200 may include a flexible, or foldable display 202 having a bendable section 216. In some implementations, the bendable section 216 can be located approximately at a midpoint along a length of the display 202. The flexible, or foldable display 202 may be supported in a housing 240. A hinge mechanism 300 may support the folding and the unfolding of the foldable display 202. The hinge mechanism 300 may include a first display stiffener 340, a second display stiffener 350, and a display support 320 positioned between the first display stiffener 340 and the second display stiffener 350. The hinge mechanism 300 may also include a spring stiffener 330 positioned between the housing 240 and the first and second display stiffeners 340, 350. In some implementations, the spring stiffener 330 may be made of a sheet metal material, such as a steel material, of a thickness that allows for elastic bending of the spring stiffener 330. In some implementations, a framing member 270 may be coupled on the assembled components of the computing device 200 (i.e., on the assembled the foldable display 202, the hinge mechanism 300, and the housing 240). The spring stiffener 330 may support the display 202 to maintain a desired shape and/or configuration of the display as the display is folded and unfolded.

In some implementations, the first display stiffener 340 may be coupled to, for example, laminated to or adhered to, a first portion 212 of the foldable display 202, such that the first display stiffener 340 is fixed to the first portion 212 of the foldable display 202. In some implementations, the second display stiffener 350 may be coupled to, for example, laminated to or adhered to, a second portion 214 of the foldable display 202, such that the second display stiffener 350 is fixed to the second portion 214 of the foldable display 202. Thus, the first and second display stiffeners 340, 350 may be fixed to, and move together with, the first and second portions 212, 214 of the foldable display 202. The display support 320 may be positioned between the first and second display stiffeners 340, 350, at a position corresponding to the bendable section 216 of the foldable display 202.

A first end portion 332 of the steel spring stiffener 330 may be fixedly coupled to the housing 240 (e.g., to a first housing portion 241 of the housing 240), the first display stiffener 340, and the first portion 212 of the flexible display 202. A second end portion 334 of the spring stiffener 330 may be positioned between the housing 240 (e.g., between a second housing portion 242 of the housing 240) and the second display stiffener 350. The second end portion 334 of the spring stiffener 330 may be movable, for example, slidable, relative to the second display stiffener 350 and the second portion 214 of the foldable display 202. An intermediate portion 333 of the spring stiffener 330, between the first and second portions 332, 334, may correspond to the bendable section 216 of the foldable display 202. Movement of the second end portion 334 of the spring stiffener 330 relative to the second display stiffener 350/second portion 214 of the foldable display 202 may facilitate the folding and unfolding of the foldable display 202/computing device 200.

The housing 240 may include a first housing 241, or a fixed housing 241, and a second housing 242, or a slidable housing 242. The first housing 241 may be fixed to the spring steel stiffener 330, the first display stiffener 340 and the first portion 212 of the foldable display 202. For example, in some implementations, one or more fasteners 250 may couple the first housing 241, the first end portion 332 of the spring stiffener 330, and the first display stiffener 340. The spring stiffener 330, and the first display stiffener 340 may extend laterally beyond the edges of the display 202, such that the fasteners 250 do not pass through, or directly interface with, the display 202 but rather couple with the spring stiffener 330, the display stiffener 340 and the first housing 241.

The second housing 242 (e.g., the slidable housing 242) may be fixed to the second display stiffener 350 (and the second portion 214 of the foldable display 202) by, for example, a plurality of fasteners 250. The second end portion 334 of the spring steel stiffener 330 may be movable, for example, slidable, relative to the second display stiffener 350/second portion 214 of the foldable display 202, and to the second housing 242. That is, the second portion 334 of the spring steel stiffener 330 is not fixed to the second display stiffener 350/second portion 214 of the foldable display 202, and is not fixed to the second housing 242. Thus, the spring steel stiffener 330 is movable, for example, slidable, within the space defined between the second housing 242 and the second display stiffener 350. In some implementations, the fasteners 250 can fasten the first portion 332 of the spring steel stiffener 330 to the first housing 241 while not fixedly fastening the second portion 334 of the spring steel stiffener 330 to the second housing portion 242. For example, in some implementations, the fasteners 250 can be located wider apart from each other in the region corresponding to the second housing 242 than in the region corresponding to the first housing 241 (see FIG. 4), such that the fasteners fasten the edges of the first portion 332 of the spring steel stiffener 330 to the first housing 241 but allow the second portion 334 of the spring steel stiffener 330 to slide between the fasteners. For example, in some implementations, the second portion 334 of the spring steel stiffener 330 can include oversized through holes through which the fasteners pass, but where a cross-sectional size and shape of the through holes is large compared to a cross-sectional dimension of the fasteners, so that the second portion 334 of the spring steel stiffener 330 can slide freely in a longitudinal direction (see FIG. 3A) in relation to the fasteners while being guided by the fasteners that pass through the through holes.

In some implementations, one or more grooves 244, or channels 244 may be defined in one or more inner lateral side surfaces of the second housing 242. Corresponding side edge(s) of the second portion 334 of the spring steel stiffener 330 may be received in the one or more channels 244, to guide the sliding motion of the second portion 334 of the spring steel stiffener 330 within the space formed between the second housing 242 and the second display stiffener 350.

As shown in FIG. 4A, in the unfolded configuration, there is a distance D1 between an outer edge portion of the second end portion 334 of the spring stiffener 330 and an inner peripheral edge portion of the second housing 242. As shown in FIG. 3A, in the folded configuration, there is a distance D2 between the outer edge portion of the second end portion 334 of the spring stiffener 330 and the inner peripheral edge portion of the second housing 242. In transitioning between the folded configuration and the unfolded configuration, the second end portion 334 of the spring stiffener 330 may slide in the direction of the arrow F shown in FIG. 3A, to accommodate the folding and the unfolding of the foldable display 202. For example, in transitioning from the unfolded configuration shown in FIG. 4A to the folded configuration shown in FIG. 3A, the second end portion 334 of the spring stiffener 330 slides (within the second housing 242) in the direction of the arrow F1. In the folded configuration shown in FIG. 3A, due to the sliding of the spring stiffener 330 in this manner, the distance D2 in the folded configuration is greater than the distance D1 in the unfolded configuration, to accommodate the bend in the bendable section 216 of the foldable display 202. In the folded configuration, the intermediate portion 333 of the spring stiffener 330 is bent, corresponding to the contour of the bendable section 216 of the foldable display 202 in the folded configuration of the device 200. Similarly, in transitioning from the folded configuration shown in FIG. 3A to the unfolded configuration shown in FIG. 4A, the second end portion 334 of the spring stiffener 330 slides (within the second housing 242) in the direction of the arrow F2. In the unfolded configuration shown in FIG. 4A, due to the sliding of the spring stiffener 330 in this manner, the distance D1 in the unfolded configuration is less than the distance D2 in the folded configuration, to provide for planarity in the bendable section 216 of the foldable display 202.

In some implementations, the spring stiffener 330 may be made of a relatively thin steel material having a relatively high yield strength. For example, in some implementations, the spring stiffener 330 may be made of a spring steel material in sheet form. In some implementations, the yield strength of the spring stiffener 330 may be relatively high, to provide for deflection, or deformation, or bending of the spring stiffener 330 in a portion of the spring stiffener 330 corresponding to the bendable section 216 of the foldable display 202, without degradation, over a relatively high cyclic count (for example, over greater than 200,000 cycles). In some implementations, the thickness of the spring stiffener 330 and/or the yield strength of the spring stiffener 330 may be selected or determined, based on, for example, a form factor of the computing device 200, a size/thickness of the foldable display 202, an allowable bending radius of the foldable display 202, and other such factors.

In some implementations, the spring stiffener 330 may bias the computing device 200 to the unfolded configuration. Thus, in some implementations, magnets 261, 262 may be positioned in the housing 240, to hold the computing device 200 in the folded configuration. For example, one or more first magnets 261 may be included in the first housing 241, and one or more corresponding second magnets 262 may be included in the second housing 242. The first magnet(s) 261 and the second magnet(s) 262 may be of opposite polarities, and may be positioned within the housing 240 so as to be aligned when the computing device 200 is in the folded configuration, to allow an attractive force between the magnets 261 and 262 to hold the computing device 200 in the folded configuration.

In some implementations, the display support 320 may be made of a relatively compliant material such as, for example, a compliant foam material, or an elastic foam material. In the folded configuration, the compliant material of the display support 320 may be compressed and may conform to the substantially arcuate shape of the bendable section 216 of the foldable display 202. In the unfolded configuration, the compliant material of the display support 320 may expand to support the bendable section 216 of the foldable display 202, to provide for planarity of the foldable display 202 in the unfolded configuration, particularly in the bendable section 216 of the foldable display 202.

In some implementations, the compliant material of the display support 320, together with a corresponding portion of the spring stiffener 330, may provide for external protection of the bendable section 216 of the foldable display 202, both in the folded configuration and in the unfolded configuration. In some implementations, edge portions of the foldable display 202, particularly in the area of the bendable section 216 of the foldable display 202, may be protected by corresponding portions of the framing member 270. In some implementations, the framing member 270 may be made of an elastomer material, to provide for flexibility, bending, elastic deformation and the like, particularly in portions of the computing device 200 corresponding to the bendable section 216 of the foldable display 202, so as to adapt to the folded configuration of the computing device 200. In some implementations, the framing member 270 may reinforce the coupling of the components of the computing device 200 as described above. In some implementations, the framing member 270 may provide for secondary alignment and retention of the components of the computing device 200, and may provide for a finished external appearance of the computing device 200.

In a computing device including a hinge mechanism and a sliding mechanism, in accordance with implementations as described herein, a relatively simple, and relatively reliable, the hinge mechanism and the sliding mechanism may support the folding and unfolding of a foldable display, with a relatively natural motion, while also providing for planarity of the foldable display in the unfolded configuration, particularly in the bendable section of the foldable display. The hinge mechanism and the sliding mechanism may accomplish this without the use of complicated gearing, which add cost and complexity, which produce a relatively unnatural, restrictive folding and unfolding motion, and which may detract from the utility and reliability of the computing device. This relatively simple and reliable hinge mechanism and sliding mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A foldable device, comprising:
   a foldable display;
   a first display stiffener fixed to a first section of the foldable display;
   a second display stiffener fixed to a second section of the foldable display; and
   a device housing, including:
      a first housing fixed to the first display stiffener, and fixed to the first section of the foldable display;
      a second housing fixed to the second display stiffener, and fixed to the second section of the foldable display; and
   a spring stiffener sheet positioned between the device housing and the first and second display stiffeners, the spring stiffener sheet including:
      a first portion fixed to the first housing, the first display stiffener and the first section of the foldable display such that the first portion of the spring stiffener sheet, the first housing, the first display stiffener and the first section of the foldable display move together; and
      a second portion that is movable in a space formed between the second housing and the second display stiffener.

2. The foldable device of claim 1, wherein foldable display includes a bendable section defined between the first section and the second section of the foldable display, the device further comprising:
   a display support positioned in a space formed between the first display stiffener and the second display stiffener, at a position corresponding to the bendable section of the foldable display.

3. The foldable device of claim 2, wherein the display support includes a compliant foam material that is conformable to a contour of the bendable section of the foldable display, such that the display support is in a compressed state in a folded configuration of the foldable display, and the display support is in an expanded state in an unfolded configuration of the foldable display.

4. The foldable device of claim 1, wherein,
   in a response to a folding action on the foldable device,
      the first portion of the spring stiffener sheet remains fixed to the first housing, the first display stiffener, and the first section of the foldable display, and the second portion of the spring stiffener sheet slides in a first direction within the space formed between the second housing and the second display stiffener, and
   in a response to an unfolding action on the foldable device,
      the first portion of the spring stiffener sheet remains fixed to the first housing, the first display stiffener, and the first section of the foldable display, and the second portion of the spring stiffener sheet slides in a second direction, opposite the first direction, within the space formed between the second housing and the second display stiffener.

5. The foldable device of claim 4, wherein a distance between an end portion of the second portion of the spring stiffener sheet and a corresponding end portion of the second housing in a folded configuration is greater than a distance between the end portion of the second portion of the spring stiffener sheet and the corresponding end portion of the second housing in an unfolded configuration.

6. The foldable device of claim 4, further comprising:
   a first channel defined in a first lateral side portion of an inner portion of the second housing; and
   a second channel defined in a second lateral side portion of the inner portion of the second housing, opposite the first side lateral side portion thereof,
   wherein the first channel and the second channel are configured to slidably receive corresponding first and second outer peripheral edge portions of the second end portion of the spring stiffener sheet, so as to guide the sliding of the spring stiffener sheet in the first and second directions within the space formed between the second housing and the second display stiffener.

7. The foldable device of claim 1, wherein the spring stiffener sheet is made of a high yield strength steel material.

8. The foldable device of claim 1, wherein the spring stiffener sheet is configured to bias the foldable device to an unfolded configuration.

9. The foldable device of claim 8, further comprising at least one pair of magnets, including:
   at least one first magnet installed in the first housing; and
   at least one second magnet installed in the second housing, at a position corresponding to the position of the first magnet installed in the first housing in a folded configuration of the foldable device, such that an attractive force between the first magnet and the second magnet maintains the foldable device in the folded configuration.

10. The foldable device of claim 1, further comprising a framing member extending along a periphery of the foldable display, the first and second display stiffeners, the spring stiffener sheet and the device housing, wherein the framing member includes an elastomer material so as to adapt to a folded configuration and an unfolded configuration of the foldable device.

11. The foldable device of claim 1, wherein the foldable display includes an organic light emitting diode (OLED) display.

12. A foldable device, comprising:
   a foldable display; and
   a device housing, the device housing including:
      a first housing fixed to a first section of the foldable display;

a second housing fixed to a second section of the foldable display; and a spring stiffener sheet positioned in a space formed between the device housing and the foldable display, the spring stiffener sheet including:

a first portion fixed to the first housing;

a second portion that is movable in a space formed between the second housing and the second section of the foldable display; and an intermediate portion between the first portion and the second portion, the intermediate portion corresponding to a bendable section of the foldable display defined between the first section and the second section of the foldable display.

13. The foldable device of claim 12, further comprising:

a first channel defined in a first inner lateral side portion of the second housing and configured to slidably receive a corresponding first peripheral edge portion of the second portion of the spring stiffener sheet; and a second channel defined in a second inner lateral side portion of the second housing, opposite the first inner lateral side portion thereof, and configured to slidably receive a corresponding second peripheral edge portion of the second portion of the spring stiffener sheet, opposite the first peripheral edge portion thereof, wherein the first and second channels guide a sliding movement of the spring stiffener sheet within the space formed between the second housing and the second section of the foldable display.

14. The foldable device of claim 13, wherein the spring stiffener sheet includes a high yield strength steel material, and is configured to bias the foldable device to an unfolded configuration.

15. The foldable device of claim 12, further comprising:

a first display stiffener fixed to the first section of the foldable display;

a second display stiffener fixed to the second section of the foldable display; and a display support positioned in a space formed between the first display stiffener and the second display stiffener, at a position corresponding to the bendable section of the foldable display.

16. The foldable device of claim 15, wherein the display support is made of a compliant foam material that is conformable to a contour of the bendable section of the foldable display, such that the display support is in a compressed state in a folded configuration of the foldable display, and the display support is in an expanded state in an unfolded configuration of the foldable display.

17. The foldable device of claim 12, wherein, in a response to a folding action on the foldable device, the first portion of the spring stiffener sheet remains fixed to the first housing and the first section of the foldable display, and the second portion of the spring stiffener sheet slides in a first direction within the space formed between the second housing and the second section of the foldable display, and in a response to an unfolding action on the foldable device, the first portion of the spring stiffener sheet remains fixed to the first housing and the first section of the foldable display, and the second portion of the spring stiffener sheet slides in a second direction, opposite the first direction, within the space formed between the second housing and the second section of the foldable display.

18. The foldable device of claim 17, wherein a distance between an end portion of the second portion of the spring stiffener sheet and a corresponding end portion of the second housing in the folded configuration is greater than a distance between the end portion of the second portion of the spring stiffener sheet and the corresponding end portion of the second housing in the unfolded configuration.

19. The foldable device of claim 12, further comprising at least one pair of magnets, including:

at least one first magnet installed in the first housing; and at least one second magnet installed in the second housing, at a position corresponding to the position of the first magnet installed in the first housing in a folded configuration of the foldable device, such that an attractive force between the first magnet and the second magnet maintains the foldable device in the folded configuration.

20. The foldable device of claim 12, further comprising a framing member extending along a periphery of the foldable display, the first and second display stiffeners, the spring stiffener sheet and the device housing, wherein the framing member includes an elastomer material so as to adapt to a folded configuration and an unfolded configuration of the foldable device.

* * * * *